United States Patent
Lin

(10) Patent No.: US 6,356,226 B1
(45) Date of Patent: Mar. 12, 2002

(54) ALL DIGITAL AND ADJUSTABLE SCALE DEVICE

(76) Inventor: Wu-Fu Lin, 2F, No. 39, Pao Hsing Rd., Hsintien, Taipei Hsien (TW)

( * ) Notice: Subject to any disclaimer, the term of this patent is extended or adjusted under 35 U.S.C. 154(b) by 0 days.

(21) Appl. No.: 09/526,086

(22) Filed: Mar. 15, 2000

(51) Int. Cl.[7] ................................................. H03M 1/12
(52) U.S. Cl. ....................................................... 341/155
(58) Field of Search ................................ 341/155, 167, 341/166, 168, 169

(56) References Cited

U.S. PATENT DOCUMENTS 5,612,698 A * 3/1997 Reay ........................... 341/167

* cited by examiner

*Primary Examiner*—Brian Young
(74) *Attorney, Agent, or Firm*—Rosenberg, Klein & Lee

(57) ABSTRACT

An all-digital and adjustable scale device comprises at least one load cell, a connection box and a controller housed within a controller main body. The connection box contains a plurality of A/D converters with input connected to corresponding load cell and output connected to a single-chip microcomputer. The controller comprises a control circuit having a microcomputer unit, a keyboard, a display and an interface. The microcomputer unit is connected to the single-chip microcomputer and the keyboard is arranged on the controller main body. The user can input command to the control circuit and controls the single-chip microcomputer through the control circuit for four-corner balance, adjustment, calibration and self-testing.

6 Claims, 2 Drawing Sheets

ALL DIGITAL AND ADJUSTABLE SCALE DEVICE

FIELD OF THE INVENTION

The present invention relates to an all-digital and adjustable scale device, especially to an all-digital and adjustable scale device with a controller and a keyboard whereby user can input command through the keyboard for four-corner balance, adjustment, calibration and self-testing.

BACKGROUND OF THE INVENTION

The conventional multiple load cell scale device, as shown in FIG. 1, comprises a controller 70, a connection box 65 containing a plurality of voltage regulators VR (VR 1–VR N) each connected to a corresponding load cell 60 on one end thereof. The another ends of the voltage regulators VR are tied together and connected to input of an A/D converter 701 within the controller 70. The output of the A/D converter 701 is connected to a microcomputer 702. The microcomputer 702 is connected to a keyboard 703, a display 704 and an interface 705 such as RS-232 interface.

The above-mentioned multiple load cell scale device should be adjusted through respective voltage regulators VR such that each load cell has signal with equivalent strength. The four comers of a loadometer using multiple load cell scale device have balance and the load measured at various points of a conveying surface is correct. However, for balance adjustment, the load of the above-mentioned multiple load cell scale device should be repeatedly loaded and unloaded, and the voltage regulators VR corresponding load cell also requires adjustment to obtain required accuracy within allowable error. The adjustment task requires experienced technician and each load cell should be of same specification. The adjustment task is influenced by human factor and the resolution is limited by the number of the load cell. The signal is degraded when the number of parallel-connected load cells is increased.

It is the object of the present invention to provide an all-digital and adjustable scale device, which does not need tool for adjustment, load cell of the same specification, and repeated loading and unloading of the load cell.

To achieve above object, the present invention provides an all-digital and adjustable scale device, which has a plurality of A/D converters to convert analog measurement result to digital value and a single-chip microcomputer to manipulate the digital value. The user can input command through a keyboard for four-corner balance, adjustment, calibration and self-testing.

The various objects and advantages of the present invention will be more readily understood from the following detailed description when read in conjunction with the appended drawing, in which:

DETAIL DESCRIPTION OF PREFERRED EMBODIMENT

Figure 1:
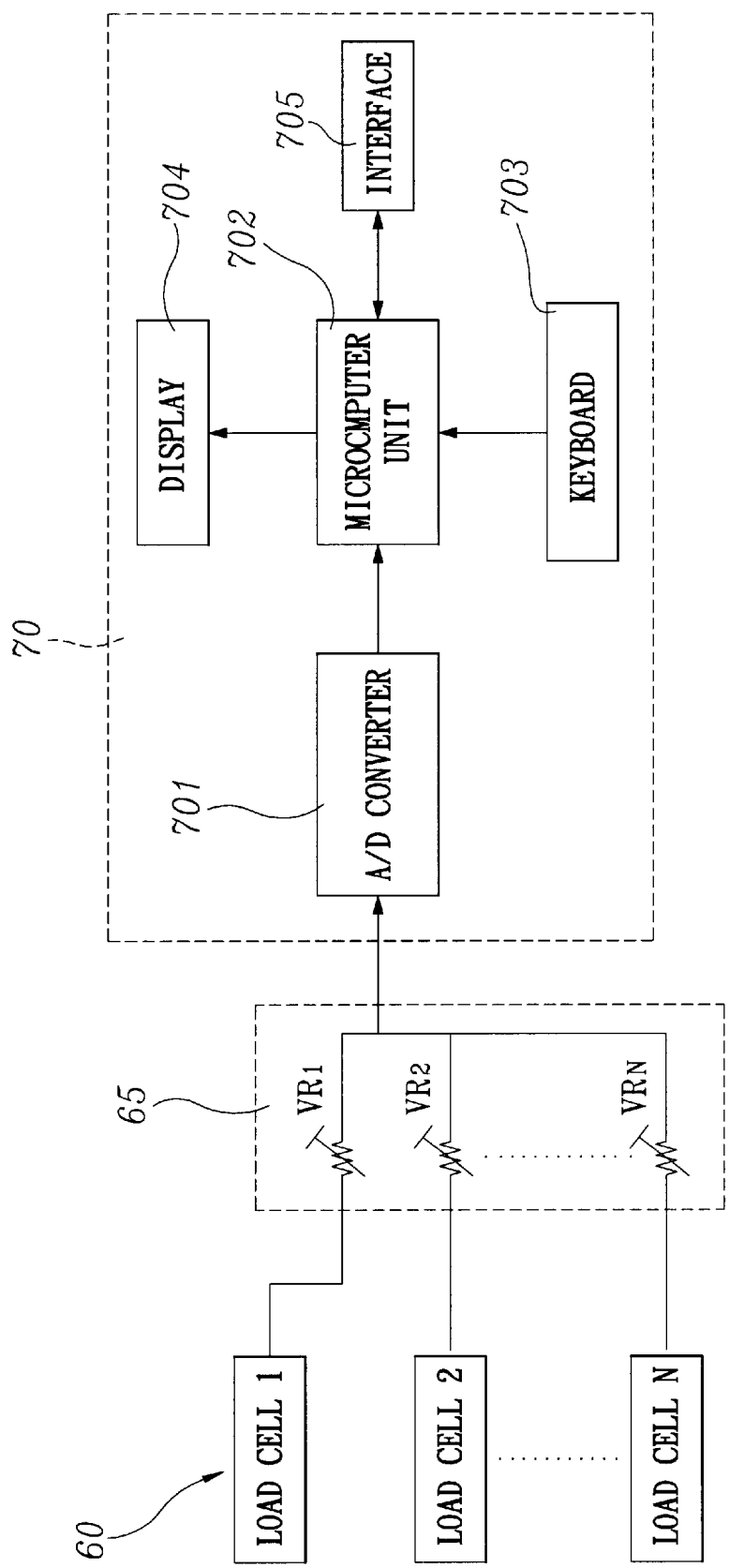
FIG. 1 is a block diagram of a prior art multiple load cell scale device.
Figure 2:
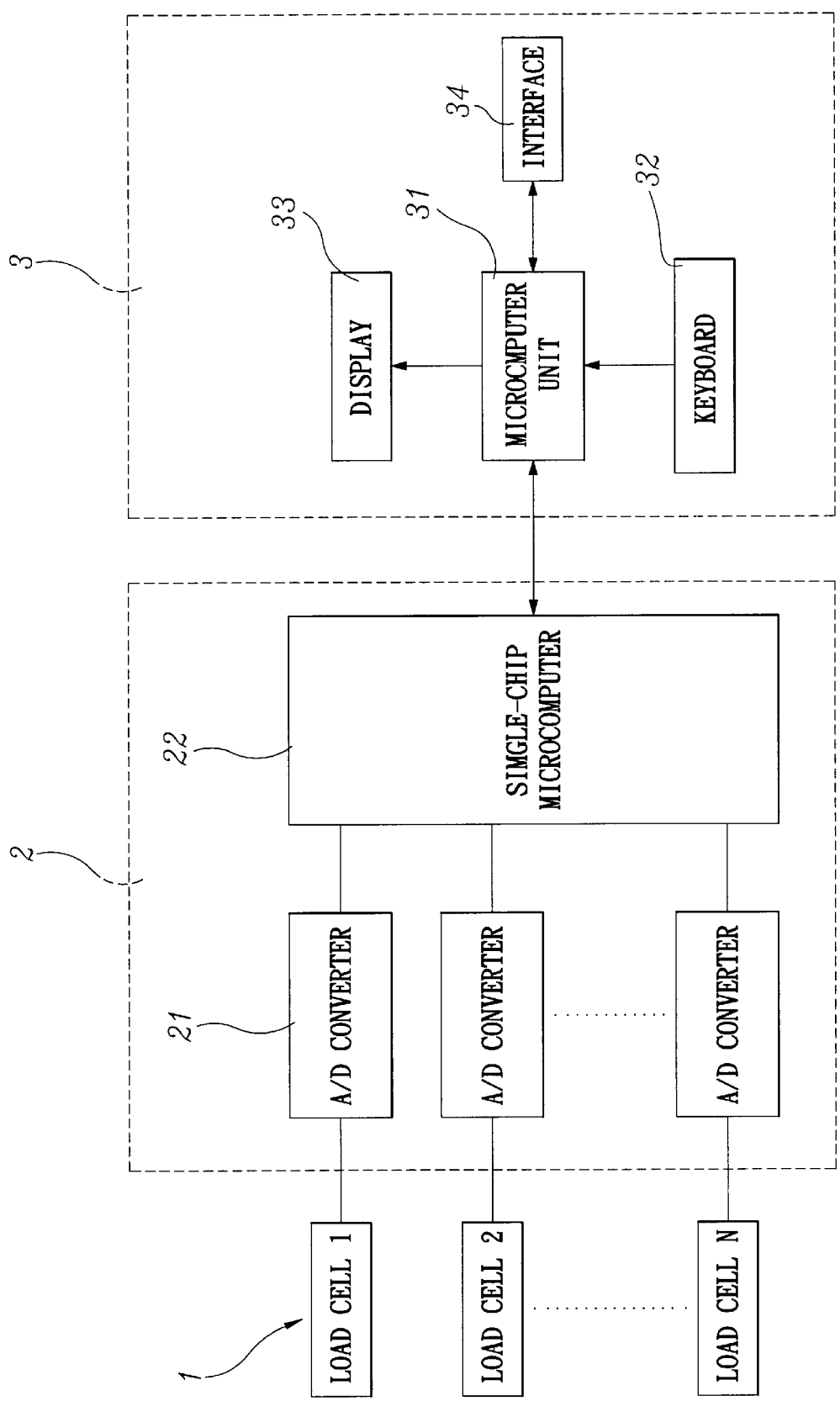
FIG. 2 is a block diagram of an all-digital and adjustable scale device of the present invention.

FIG. 2 shows a block diagram of a preferred embodiment of the present invention. The all-digital and adjustable scale device 1 comprises a plurality of load cells 1, a connection box 2 and a controller 3.

The connection box 2 comprises a plurality of A/D converters 21. The input of each A/D converter 21 is connected to each load call 1 and the output of each A/D converter 21 is connected to a single-chip microcomputer 22. The output of the microcomputer 22 is connected to control circuit of the controller 3.

The AID converter 21 is functioned to convert analog signal measured by the load cells 1 to digital signal and sends the digital signal to the single-chip microcomputer 22, whereby the single-chip microcomputer 22 manipulates each set of digital signal and sends the digital to control circuit of the controller 3 housed by a main body.

The control circuit of the controller 3 comprises a microcomputer unit 31 connected to the single-chip microcomputer 22. The output of the microcomputer unit 31 is connected to a display 33 and connected, through an interface 34 such as RS-232 interface, to external device. The input of the microcomputer unit 31 is connected to a keyboard 32. In the present invention, the keyboard 32 is arranged on the main body of the controller 3. By operating the keyboard 32, user can perform four-corner balance adjustment and calibration of the inventive all-digital and adjustable scale device 1.

Through the command input by the keyboard 32, the microcomputer unit 31 of the controller 3 commands the single-chip microcomputer 22 within the connection box 2 to perform tasks of four-corner balance such as automatic adjustment, signal strength examination, signal channel open/close, respective signal, and signal channel self testing.

To sum up, the inventive all-digital and adjustable scale device has following advantages:

1) The inconvenience and inaccuracy of conventional scale device are overcome.
2) The voltage regulator is save to improve long-term stability.
3) The adjustment by tool is saved.
4) The series adjustment is saved.
5) The requirement of same load cell is saved.
6) The load does need to repeatedly load and unload.
7) The connection box and controller involves with digital signal, the EMI effect is minimized.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. An adjustable electronic scale comprising:
   at least one load cell for output of an analog loading signal responsive to a pressure force applied thereto;
   at least one A/D converter connected to the at least one load cell and converting the analog loading signal of the load cell into a digital loading signal provided at an output thereof;
   a single-chip microcomputer connected to the output of the A/D converter and receiving the digital loading signal therefrom, the single-chip microcomputer manipulating the digital loading signal to output an output signal; and
   a control circuit having an input connected to the single-chip microcomputer and receiving the output signal therefrom for further processing and output of signals representing a value of force loading corresponding to the pressure force, the control circuit having an input for a user to input commands for controlling the single-chip microcomputer through the control circuit for initiation of four-corner balancing, adjustment, calibration and self-testing.

2. The adjustable electronic scale as in claim 1, wherein the A/D converter and the single-chip microcomputer are housed within a connection box.

3. The adjustable electronic scale as in claim 1, wherein the control circuit is housed in a controller main body.

4. The adjustable electronic scale as in claim 1, wherein the control circuit further comprises a microcomputer unit, a keyboard connected to an input of the microcomputer, and a display coupled to an output of the microcomputer for display of the value of force loading, the microcomputer unit being connected to an external device through an interface unit.

5. The adjustable electronic scale as in claim 4, wherein the control circuit is housed in a controller main body and the keyboard is arranged on the controller main body.

6. An adjustable electronic scale comprising:

a plurality of load cells, each of said load cells outputting an analog loading signal responsive to a respective pressure force applied thereto;

a plurality of A/D converters respectively connected to said plurality of load cells, each of said A/D converters converting a respective analog loading signal of a corresponding load cell into a digital loading signal provided at an output thereof;

a single-chip microcomputer having a plurality of inputs respectively connected to said outputs of said A/D converters and receiving said digital loading signals therefrom, the single-chip microcomputer manipulating the digital loading signals to output an output signal; and a control circuit having an input connected to the single-chip microcomputer and receiving the output signal therefrom for further processing and output of signals representing a value of force loading relating to said pressure forces applied to said plurality of load cells, the control circuit having an input for a user to input commands for controlling the single-chip microcomputer through the control circuit for initiation of four-corner balancing, adjustment, calibration and self-testing.

* * * * *